United States Patent [19]
Ishihata et al.

[11] Patent Number: 5,278,975
[45] Date of Patent: Jan. 11, 1994

[54] SYNCHRONIZATION CONTROL SYSTEM IN A PARALLEL COMPUTER

[75] Inventors: Hiroaki Ishihata, Tokyo; Morio Ikesaka, Yokohama; Takeshi Horie, Kawasaki, all of Japan

[73] Assignee: Fujitsu Limited, Kawasaki, Japan

[21] Appl. No.: 715,583

[22] Filed: Jun. 14, 1991

[30] Foreign Application Priority Data

Jun. 14, 1990 [JP] Japan .................................. 2-154046
Jul. 9, 1990 [JP] Japan .................................. 2-179493

[51] Int. Cl.⁵ .................................................. G06F 1/04
[52] U.S. Cl. .................................................. 395/550
[58] Field of Search ............... 364/DIG. 1; DIG. 2; 395/550, 200

[56] References Cited

U.S. PATENT DOCUMENTS 4,989,131  1/1991  Stone ................................... 364/200

Primary Examiner—Robert L. Richardson
Attorney, Agent, or Firm—Staas & Halsey

[57] ABSTRACT

An inter-processor synchronization control system in a distributed memory type parallel computer comprises a unit for detecting an establishment of the synchronization of all PEs, a status request register unit provided for each PE for independently issuing a status request through a status request signal, a unit for determining the issues of requests from status request registers of all PEs, a unit for distributing the determination to all PEs and a status detecting register for detecting the status according to the distributed determination and the output of the synchronization establishment detection unit. The inter-processor synchronous control system detects the status of all PEs when the synchronization is established in all PEs.

14 Claims, 19 Drawing Sheets

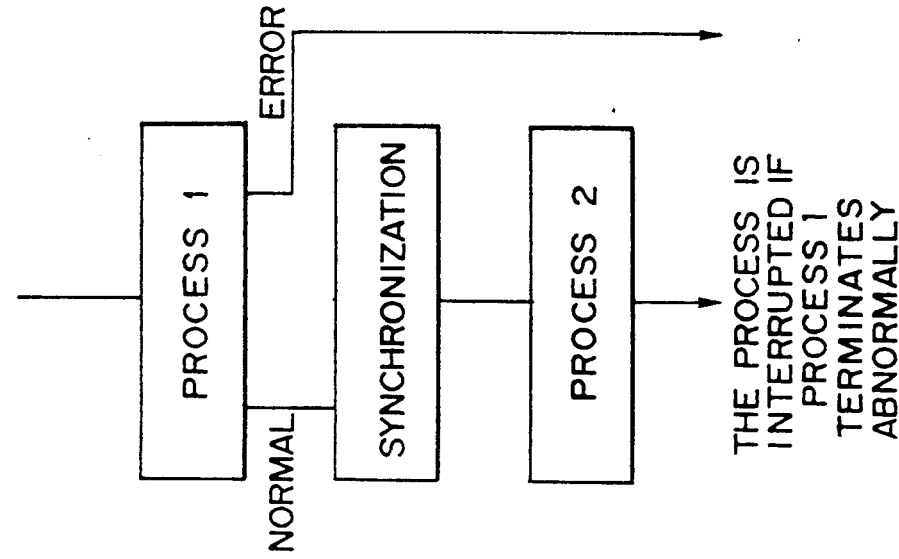
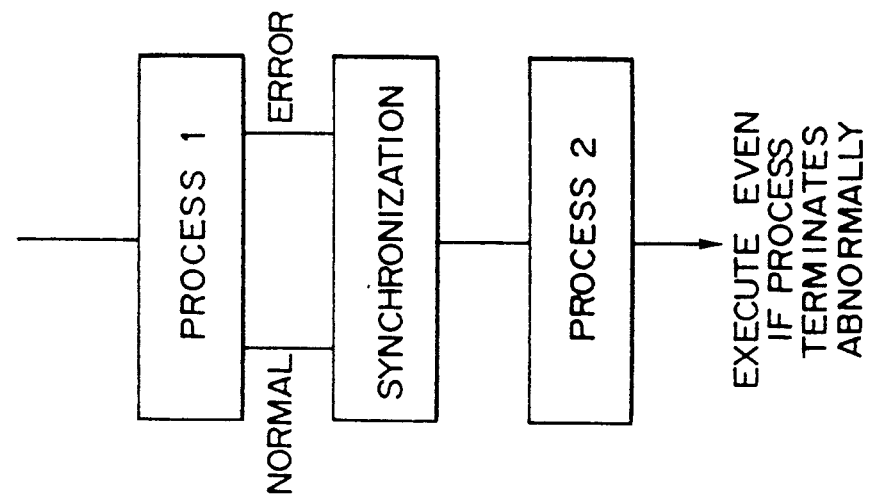
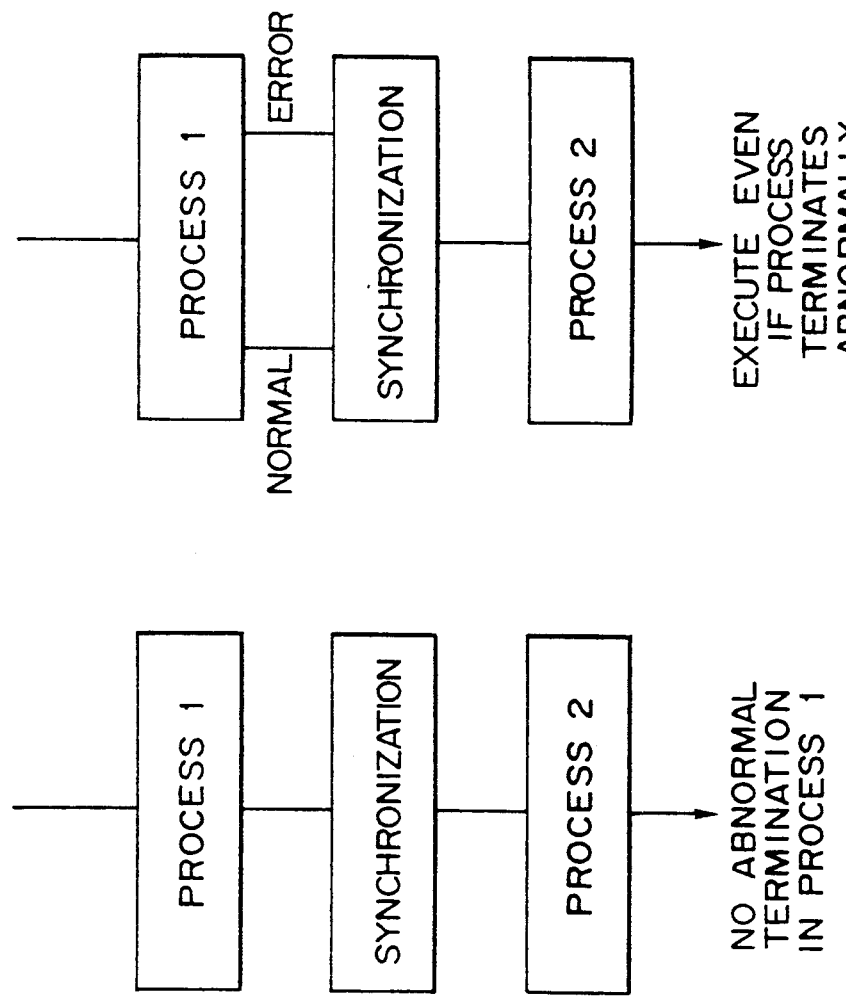

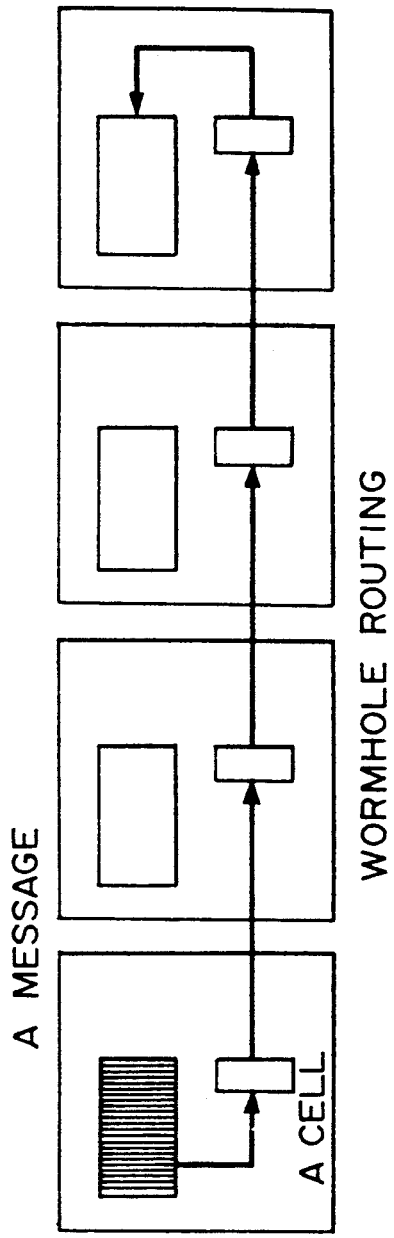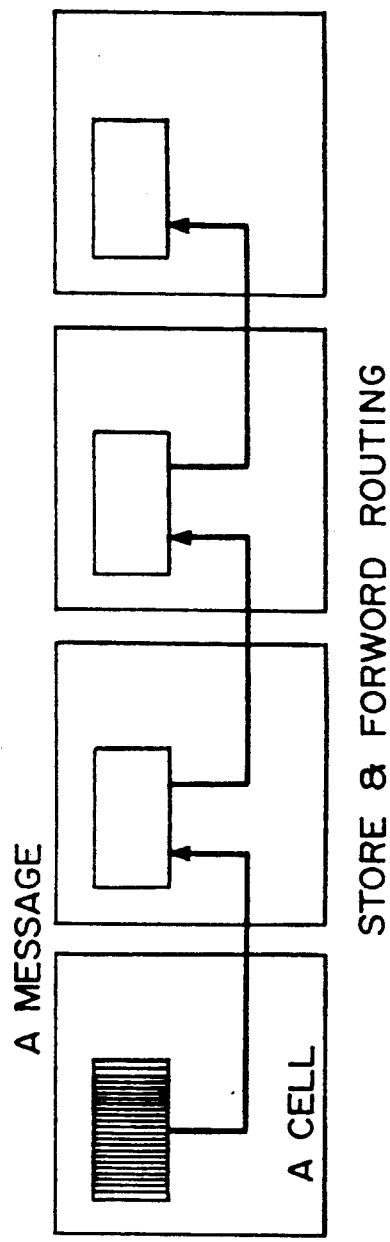

SYNCHRONIZATION CONTROL SYSTEM IN A PARALLEL COMPUTER

BACKGROUND OF THE INVENTION

1. Field of the Invention

The present invention relates to an interprocessor synchronization system for parallel computers which connects a plurality of independently operated processor elements (hereinafter referred to as PE, PEs) through a communication network and enables them to operate synchronously in parallel; and, more particularly, to a detecting system in a parallel computer for detecting a synchronization, a status or a stable state of the PEs.

2. Related Art

With the development of semi-conductor technology, it has become possible to develop a high performance microprocessor and a large capacity memory built in a smaller configuration at low cost, thereby enabling a parallel computer to be produced easily by using a number of such microprocessors and memories. To efficiently process a single job with a plurality of PEs in parallel, a job can be divided into some steps each allotted to a respective PE prior to execution. For the parallel execution of a job, the processing sequence of these steps must be carefully considered. That is, it must be ensured that every PE finishes processing one step before proceeding to the next step. To accomplish this, an efficient inter-processor synchronous operation which realizes a high speed parallel computer is required.

A first related art for operating a parallel computer is a memory sharing method.

The above described inter-processor synchronous operation can be performed with PEs having a shared memory, a part of which is exclusively used for reading and writing.

The second related art is a synchronization register method where a synchronization register is provided for each PE, the logical product of the outputs of synchronization registers of all PEs is detected, and then the result is returned to all PEs, thereby detecting the synchronous state of all PEs.

The third related art is a state detecting method. In this method, as shown in FIG. 1, in each PE of a parallel processing system, a process 1 is executed, then a message is sent/received between PEs as a process 2. When the message is completely processed, the PEs proceed to the next step. At this time, if all PEs are waiting for a message (that is, no PEs are in execution) and no messages exist in the network (this state is referred to as a stable state of all PEs), a host processor recognizes this state, and broadcasts a command to all PEs, in response to which each PE starts processing a corresponding command. Thus, each PE can be informed of the state and proceed to the next proceeding step.

There is a problem with the memory sharing method in that when the number of PEs is substantially increased, a memory is too frequently accessed.

In the synchronization register method, there are no conflicts of accessing a shared memory since a synchronization register can be accessed independently in each PE. In the synchronization mechanism of this method, no problems occur when all PEs are operating normally in the process 1 as shown in FIG. 2A. In this case, all PEs can proceed to the step 2 after the synchronous register detects that the synchronization occurs after all PEs have completed the process 2. When there are any abnormal conditions in the process 1 (for example, bugs in a program, a division by zero, overflow, etc.) two countermeasures are taken in the related art technology. One of them is, as shown in FIG. 2B, to ignore an error by a PE in the process 1, detect the synchronous state with the other synchronization register, and proceed to the process 2. The other countermeasure is, as shown in FIG. 2C, to interrupt the process 1 in all PEs when any error of any PE is detected in the process 1. In the former, there is a problem that an error, if one occurs, is broadcast so late that the process 1 is executed in vain because all PEs, other than the PE in error in the process 1, proceed to the process 2 without being informed of the error. Further, an incorrect result may be achieved due to ignorance of the error. In the latter case, on the other hand, all PEs other than the PE in error in the process 1 get into the synchronous waiting state, as the error is not informed of all PEs except the PE in error, and the synchronization process for the other PEs is not completed as the synchronous signal is not sent to them from the PE in error, thus preventing them from proceeding to the process 2.

In the system of the related art technology, the synchronization request or status request cannot be completely detected when any messages remain in the network. When the message does not exist in respective PEs, but remains in a communication path between PEs, and if the synchronization request or the status request issues, the process advances to the next step. Then, a problem arises that a particular PE processes in the next step the data to be processed in the previous step, when the data which remains in a network arrives at the particular PE. That is, when all PEs are in the state of the synchronization establishment, one PE recognizes it earlier than other PEs and possibly proceeds to the next step.

SUMMARY OF THE INVENTION

An object of the present invention is to detect the synchronous state of all PEs and the status of each PE. Therefore, it prevents PEs not in error from performing an erroneous process and being kept in the synchronous waiting state by taking an appropriate action immediately after an error occurs in a PE. As a result, the present invention detects at a high speed the inter-processor synchronous operation and improves the operating speed.

Another object of the present invention is to provide appropriate means for observing the state of the whole network and detecting the stable state of all PEs with regard to the synchronization or the status of PEs.

The parallel computer system of the present invention first detects no messages in the network and then detects the inter-processor stable state because the stable state cannot be recognized when any messages exist in the network (the massages may be received by a PE and the PE gets out of the message-waiting state) even if each PE is correctly informed of the stable state especially when all PEs are in the message-waiting state.

A feature of the present invention resides in use of an inter-processor synchronization control system in a distributed memory type parallel computers provided with a plurality of independently operated PEs. The system comprises a synchronization request register means for permitting each PE to independently issue a synchronization request through a synchronization request signal, a determining unit for determining the issuance of requests from synchronization request registers of all PEs, a distributing unit for distributing the determination to all PEs, a synchronization detecting register unit for detecting synchronization according to the distributed determination, a status request register unit provided for each PE for independently issuing a status request through a status request signal, a unit for determining the issues of requests from status request registers of all PEs, a distributing unit for distributing the determination to all PEs and a status detecting register unit for detecting the status according to the distributed determination and the output of the synchronization detecting unit, wherein the inter-processor synchronization control system detects the status of all PEs when the synchronization is established in all PEs.

Another feature of the present invention resides in a stable state detecting system in a distributed memory type parallel computer connected with a number of independently operated computers through the communication network comprising a synchronization request register unit for permitting each PE to independently issue a synchronization request through a synchronization request signal, a unit for obtaining a logical product of the output from synchronization request registers of all PEs, a unit for distributing the result to all PEs, a synchronization detecting register unit for detecting the synchronization according to the distributed result, a unit for receiving a signal of the communication network status, a synchronization stability request detecting unit for detecting a synchronization request in each PE and no messages in the network through the output of the synchronization request register and a signal line for receiving the status signal, wherein the stable state detecting system detects that no messages exist in the network and that all PEs are in the message waiting state.

A further feature of the present invention resides in a stable state detecting system in a distributed memory type parallel computer connected with a number of independently operated computers through the communication network, comprising a status request register indicating the status of each PE, a unit for obtaining a logical product of a request register for all PE status, a unit for distributing the result to all PEs, a status detecting register unit for detecting a status according to the distributed result, and a unit for indicating the communication network state, wherein the stable state detecting system detects that no messages exist in the network and that all PEs are in the message waiting state by obtaining the logical product of the signal line notifying the state of the communication network and the output of the status request register.

BRIEF DESCRIPTION OF THE DRAWINGS

FIGS. 2A to 2C show a relation between a process of a PE and an establishment of a synchronization in a related art;

FIGS. 10A and 10B explains a wormhole routing and a store and forward routing;

FIG. 20 shows a flowchart for detecting a network state in the embodiment shown in FIG. 17;

FIG. 21 designates a block diagram of a third embodiment according to the present invention; and FIG. 22 designates a block diagram of a further embodiment of the present invention.

PREFERRED EMBODIMENT

Figure 1:
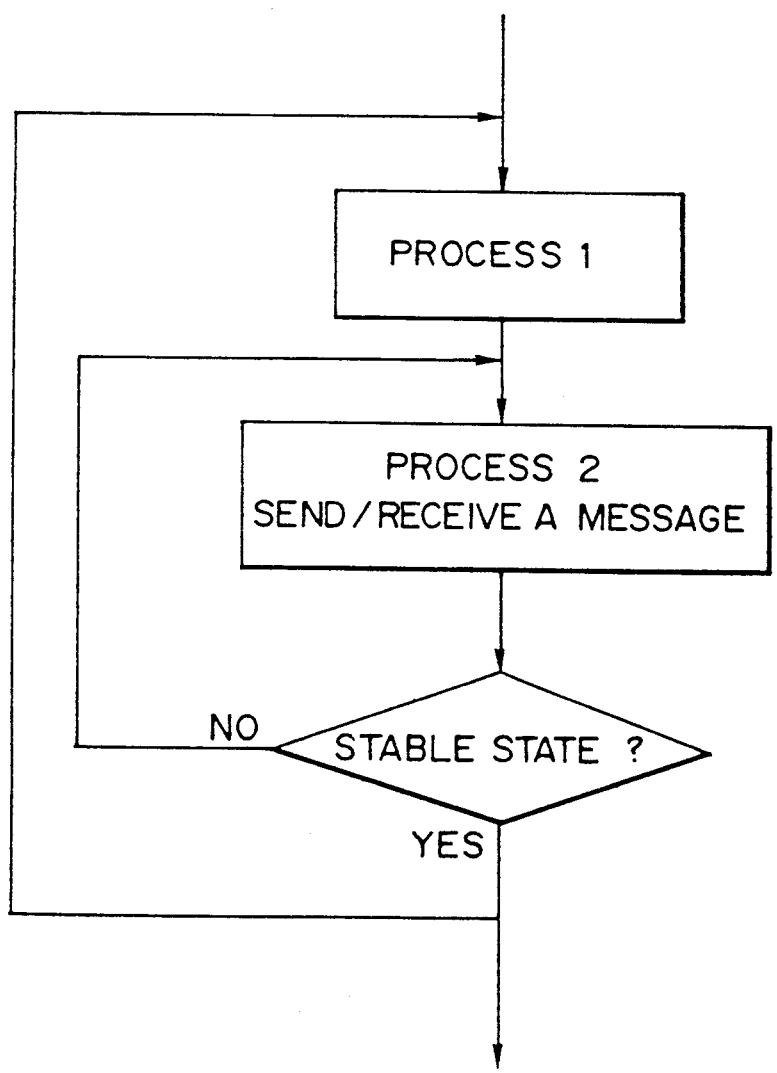
FIG. 1 shows a flowchart for detecting a stable state of a PE in a related art.
Figure 3:
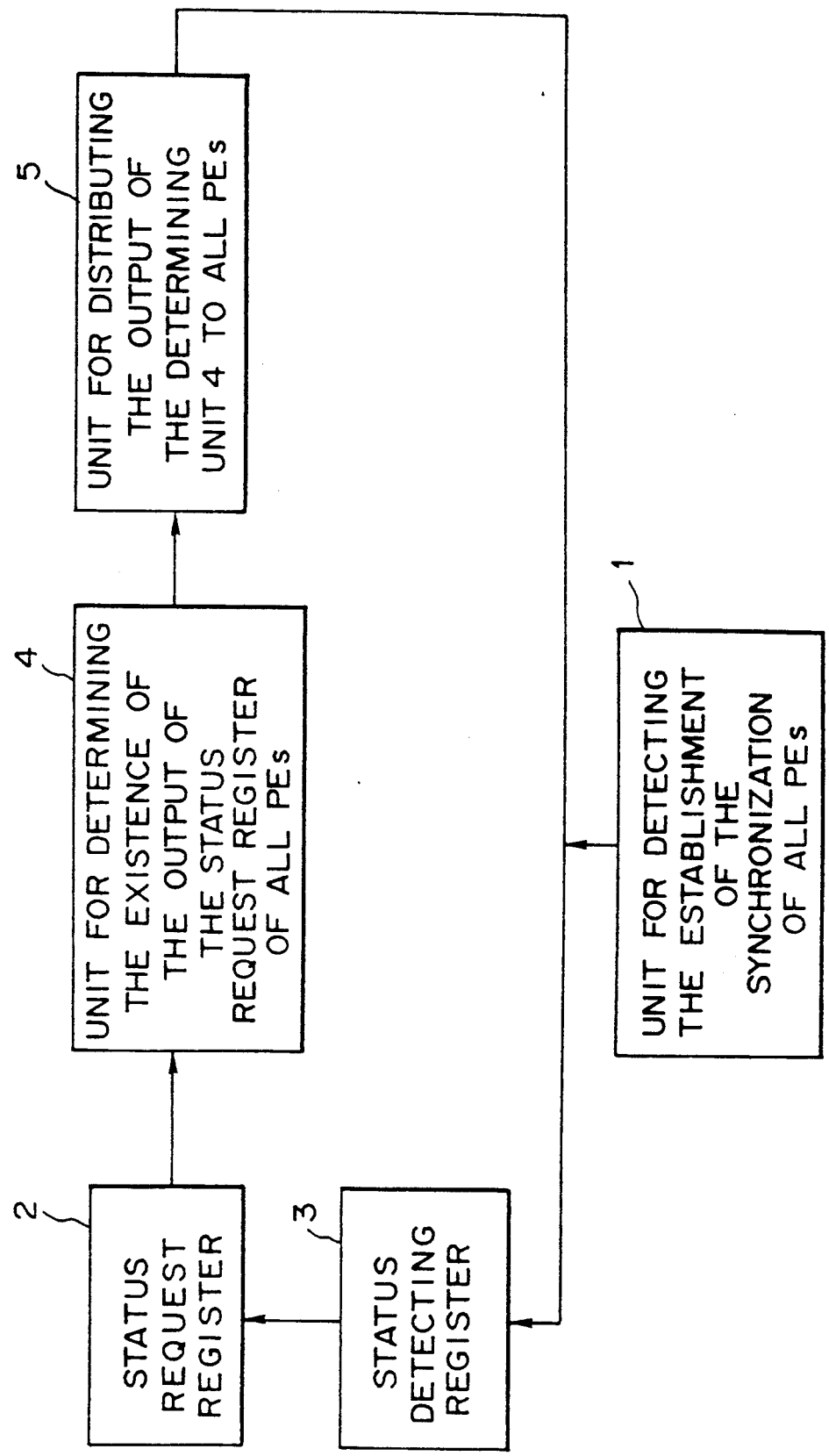
FIG. 3 shows a block diagram of the first principle of the present invention.

FIG. 3 is a block diagram explaining the principle of the present invention.

The present invention is implemented with a parallel computer synchronization system based on the synchronization register system, that is, a distributed memory type parallel computer system connected by a number of independently operated computers, each provided with a unit 1 for detecting the establishment of the synchronization of all PEs comprising a synchronization request register and a synchronization detecting register for each PE, a unit for obtaining a logical product of synchronization request registers of all PEs, and a unit for distributing the result to all PEs.

A status request register 2 is provided for each PE and receives logic 1 from the CPU of a PE when the status of the PE is normal.

Next, a judging means 4 judges that the status of all PEs is normal.

A distributing means 5 distributes the output of the judging means 4 to all PEs.

The content of the status detecting register is changed when the status of all PEs is normal and synchronization detecting means 1 of all PEs detect the synchronization of all PEs.

When a status detecting register 3 detects that the status of all PEs is normal, the next step is processed.

The first principle of the present invention, in its process 1, clears the status of each signal indicating "normal" of each PE and admits proceeding to the next step only when the synchronization of all PEs is established as shown in block 1, and when the normal status of all PEs is established as shown in block 4. Therefore, when there is an error in the process 1, the process 2 is not executed even if the synchronization of all PEs is established in the process 1. Therefore, an occurrence of an error in the process 1 can be determined immediately, and an appropriate action to the error can be taken promptly, thus avoiding an erroneous operation on the side of each PE after an occurrence of an error in a single PE, or the synchronous-waiting state.

Figure 4:
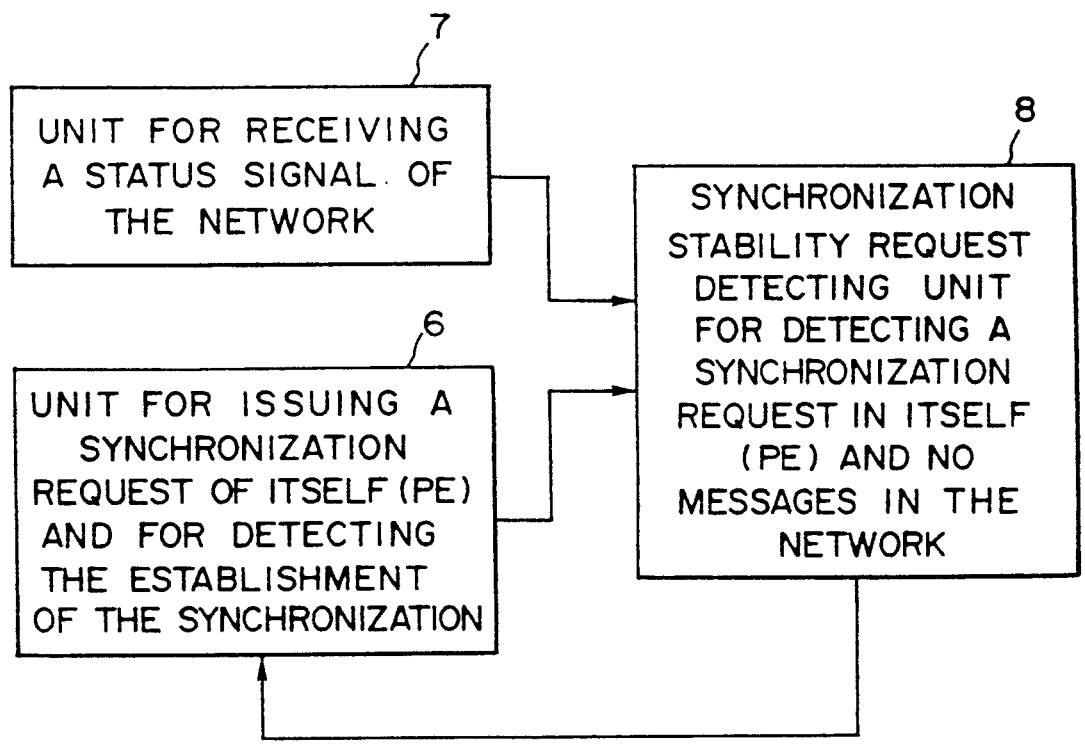
FIG. 4 shows a block diagram of the second principle of the present invention.

FIG. 4 shows a block diagram of the second principle of the present invention, and relates to a distributed memory type parallel computer which connects a number of independently operated computers through a communication network; the distributed memory type parallel computer comprising a unit comprising a synchronization request register and synchronization detecting register for requesting the synchronization of each PE and detecting the synchronization of all PEs. In addition, the feature of the second principle of the present invention is to provide a unit 7 for receiving a status signal of the communication network and a synchronized stability request detecting unit 8 for determining base on the signal line for receiving a network status signal and the output of the synchronization request register that there is a synchronization request in each PE and that there are no messages in the network.

The above configuration admits detecting the stable state of all PEs indicating that there are no messages in the network and all PEs are in the message-waiting state.

The second principle of the present invention observes the status of the network to detect the stable state. In the present invention, the stable state means that there are no messages in the communication network and all PEs, and all PEs are in the message-waiting state.

To put all PEs in the message-waiting state, each PE must output a synchronization request and a signal indicating there are no messages in the network, and then recognize that all other PEs are outputting the synchronization request in the same manner. That is, each PE must detect the synchronization in the network. In other words, the present invention provides a condition that there must be no messages in the network in addition to the synchronous detection of the prior art technology. The state where there are no messages in the network means there are no messages in each PE nor on the communication route connecting each PE. Where there is a message in the network means that there is a message at least in a single PE, or there are no messages in any PEs, keeping all PEs in the message-waiting state, but there is a message on the communication route.

The message on the communication route can be received by any PE, and the PE will not be in the waiting state, putting the whole network in the unstable state. That is, if every PE has finished processing a message and outputted a synchronization request, and yet another message remains somewhere in the network, the message may possibly be received by any PE which then will have to process the message. This is inconsistent with its synchronization request. Accordingly, the present invention provides a means for detecting no messages in the network before the output of a synchronized stability request. With this means, an inconsistency with the synchronized stability request, that is, a PE must process a remaining message after the output of the synchronized stability request, can be eliminated.

Figure 5:
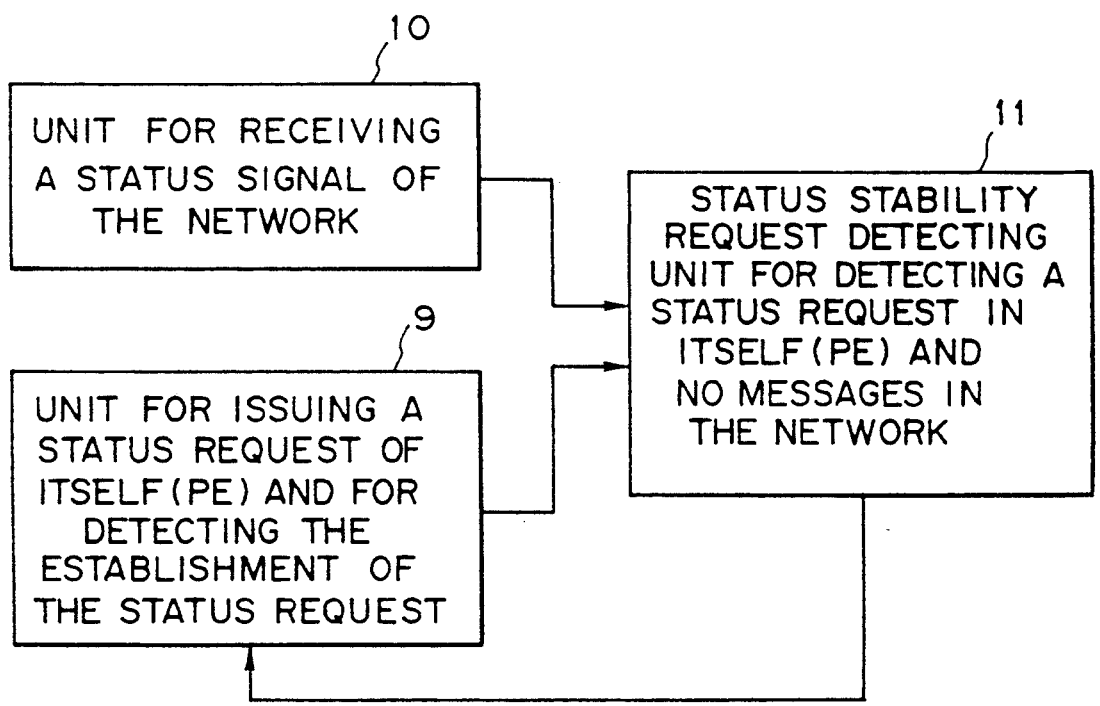
FIG. 5 shows a block diagram of the third principle of the present invention.

FIG. 5 is a block diagram of the third principle of the present invention, and relates to a distributed memory type parallel computer which connects a number of independently operated computers through a communication network; the distributed memory type parallel computer comprising and a unit 9 comprising a synchronous request register and synchronous detecting register for each PE, for requesting the status of each PE and detecting the establishment of the status request of all PEs. In addition, the feature of the third principle of the present invention is to provide a unit 10 for receiving a status signal of the communication network and a status stabilization request detection unit 11 for determining based on the signal line for receiving a status signal and the output of the status request register that there is a synchronization request in each PE and that there are and no messages in the network.

The above configuration admits detecting the stable state of all PEs indicating that there are no messages in the network and all PEs are in the message-waiting state.

Further, in the third principle of the present invention, the network state as well as the status of PEs is detected.

A parallel computer system to which the present invention is applied will be explained.

The parallel computer system to which the present invention is applied provides a distributed memory type parallel computer comprising 64 - 1024 units of processor elements (cells) and and an engineering work station (EWS) as a host computer. The communication between a cell and a host and between cells can be performed through two kinds of networks respectively; a command bus for connecting all cells and a host, and a torus network for connecting cells.

A single cell can realize a high speed operation through a 32 bit reduced instruction set computer (RISC) type microprocessor and a high speed floating point operator; and can also realize a high speed and high performance data communication capability through an efficient DMA controller. A special process hardware (optional) can be added to each cell in accordance with each application and can be customized to an exclusive parallel machine.

Figure 6:
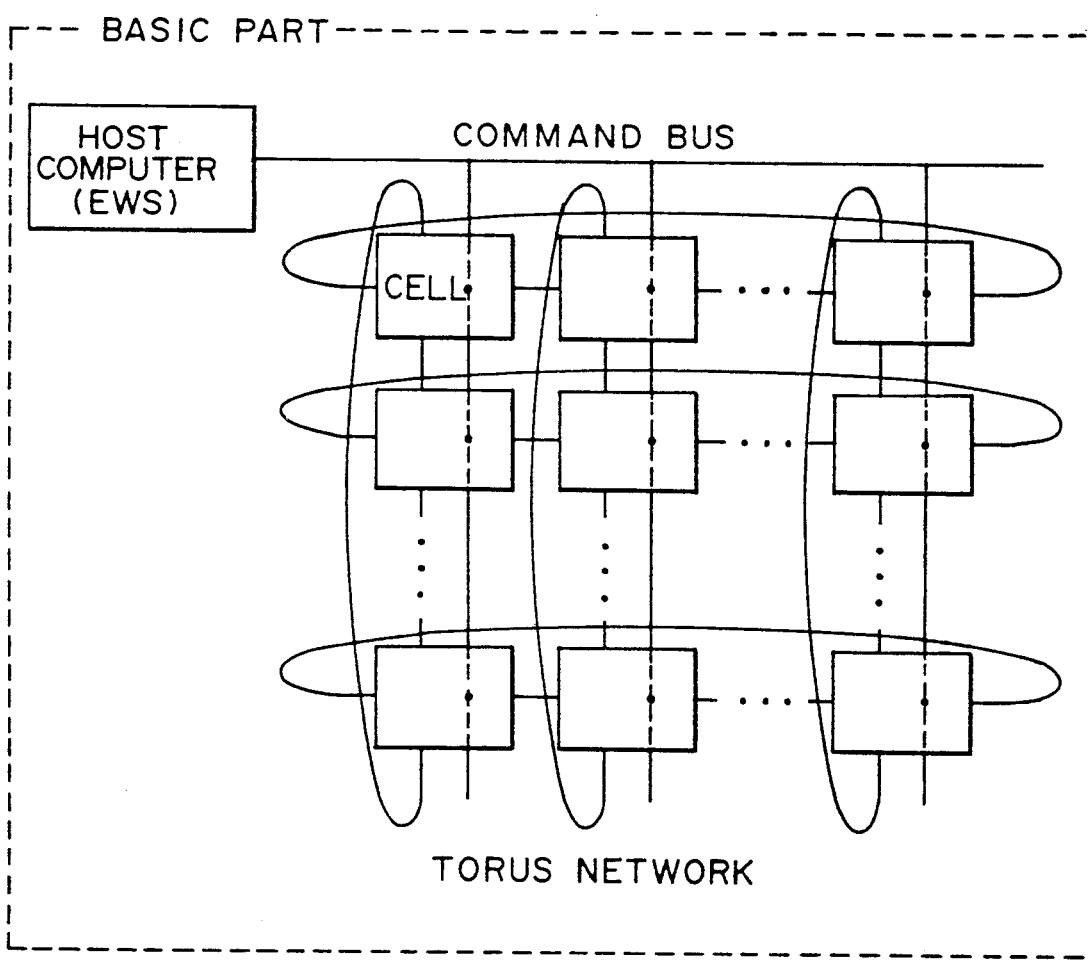
FIG. 6 represents a block diagram of a parallel computer system to which the present invention is applied.

FIG. 6 shows a basic system configuration of the parallel computer system to which the present invention is applied.

The parallel computer system to which the present invention is applied comprises a parallel processor using distributed multi-instruction multi-data (MIMD). Every processor element, called a cell, is equally configured. Each cell comprises a high-performance 32-bit microprocessor, a high-speed FPU, a cache memory, a large capacity main memory, a network interface, and a command bus interface.

Adjacent cells (four cells) are connected to one another through a torus network comprising a two-dimensional torus topology. Each cell is connected to the host computer through a command bus, and can be provided externally with optional hardware such as an image input/output device, a high speed I/O interface, a disk interface, an extended memory, a vector processor, etc.

Figure 7:
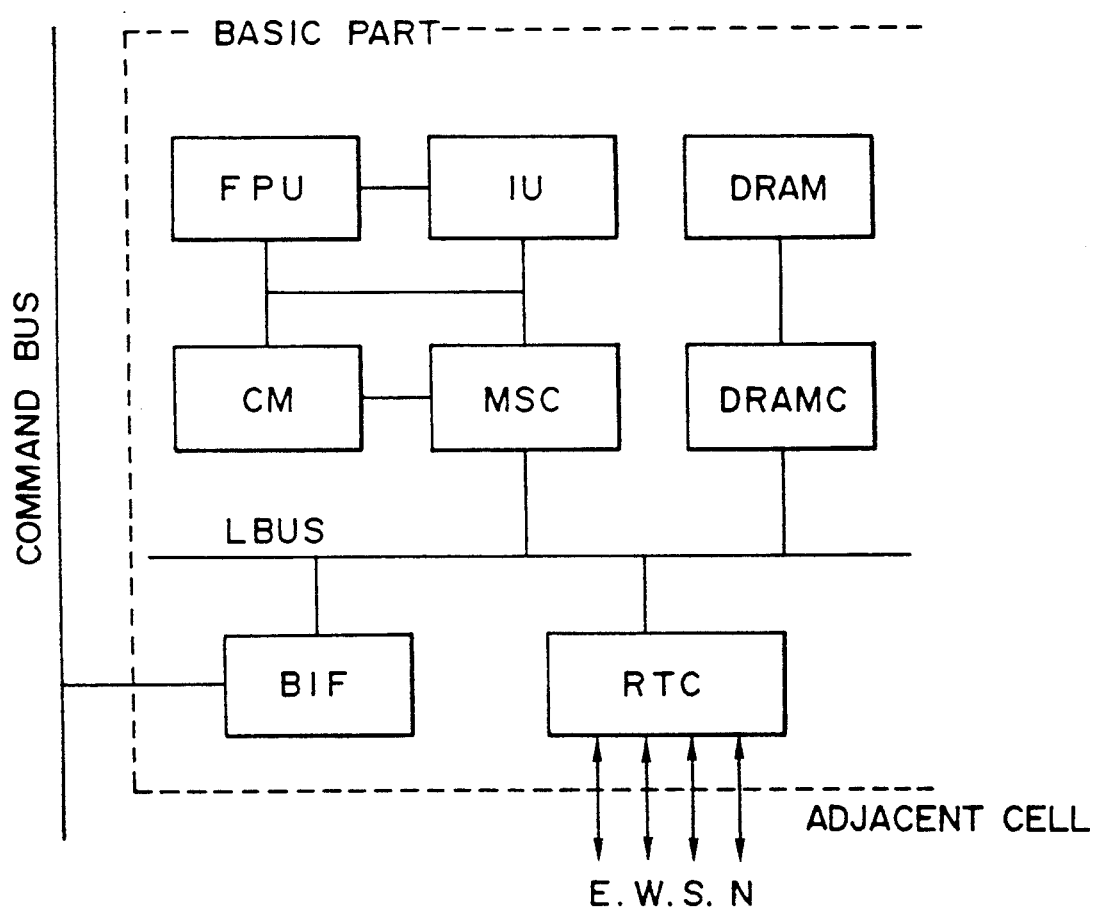
FIG. 7 represents a block diagram of a PE for use in the present invention.

FIG. 7 shows a hardware configuration of each cell processor in the parallel computer system to which the present invention is applied. A basic part of the parallel computer system is a RISC type microprocessor IU for performing integer operation, logical operation, and control, and a high speed floating point processing unit FPU, and is connected to a high speed cache memory CM. As the cache memory has a capacity of 128KB and is operated with a high hit-rate and a low traffic on the memory bus, it is implemented with the copy-back method.

A message controller MSC has a high performance DMA controller and a cache controller internally, and transmits disk data at a high speed. The DMA controller controls a 4M or 1M bit DRAM, detects, and corrects errors therein. A command bus interface BIF transmits disk data to and from a command bus, and a routing controller RTC transmits disk data to and from a torus network.

An MSC, DRAMC, RTC, and BIF are connected to an internal bus called LBUS. An LBUS is an address data multiplexed bus. The LBUS is taken out through a connector for each cell, and can be provided with various kinds of optional hardware.

This system is initialized from the host computer after power-on. The system initialization means checking the functions of various resources in this system and performing normal initialization. The system initialization can be executed by loading through a command bus an initialization program broadcasted by the host computer and then executing the program. At this time, a cell id of each cell can also be set.

A cell OS (an OS for operating system of a cell comprising a CPU is running in a cell of the initialized system, and waiting for a user program to be loaded and then for an execution request. A user program is broadcast to each cell through a command bus. A user program located in a cell is executed according to the instruction of the host computer.

When initialization data must be set in a cell, the initialization data should be broadcast from the host computer through a command bus. A broadcast through a command bus can be performed from a cell to other cells as well as from the host computer to cells. A broadcast destination can be set as a group of selected cells, and a broadcast can be performed limited to the group assigned a specific id.

Figure 8:
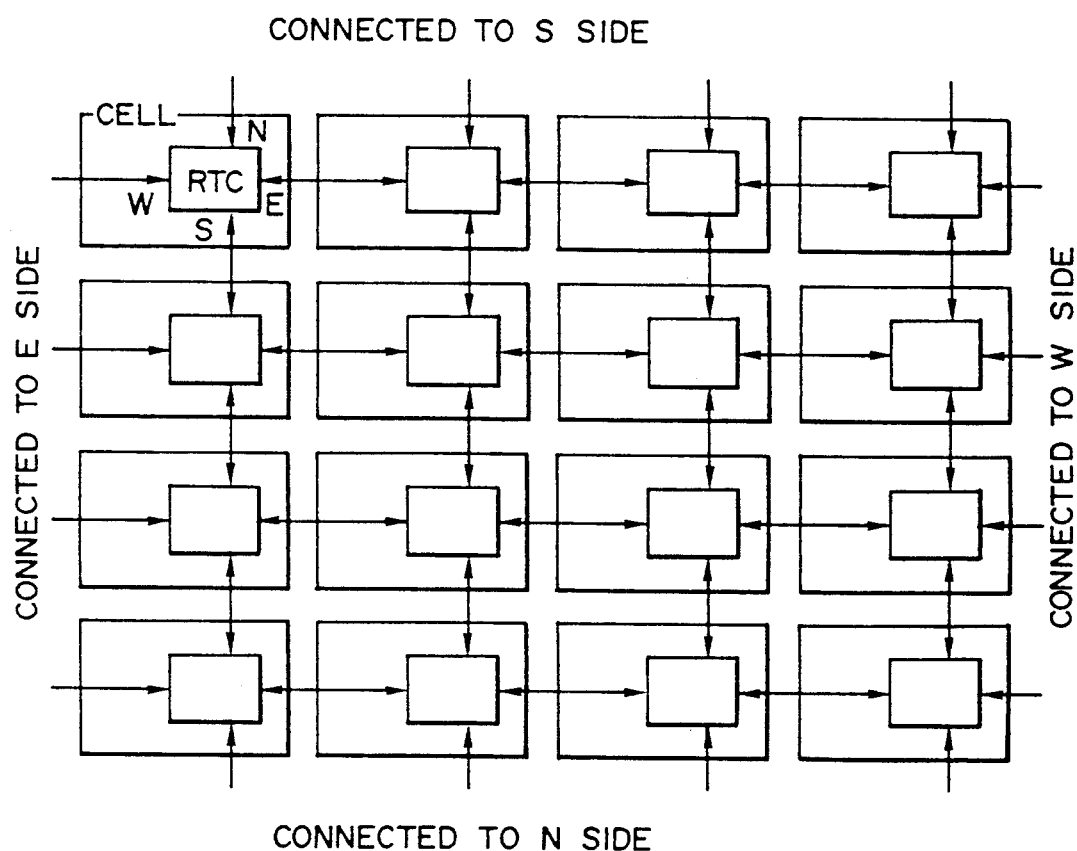
FIG. 8 depicts a configuration of a torus network in which PEs are connected.

A torus network has a configuration of routing units RTC connected by a torus form network as shown in FIG. 8. Four parts of an RTC are named east, west, south, and north (E, W, S, and N respectively). The ends of the network N and S, and W and E are connected to each other between cells. Each data transmission route of an RTC comprises 16 bit width data and a control signal. An RTC performs a relaying operation through a hardware during the communication between any cells without the operation of a CPU of each cell. The maximum configuration is 32×32 (1024) units.

Figure 9:
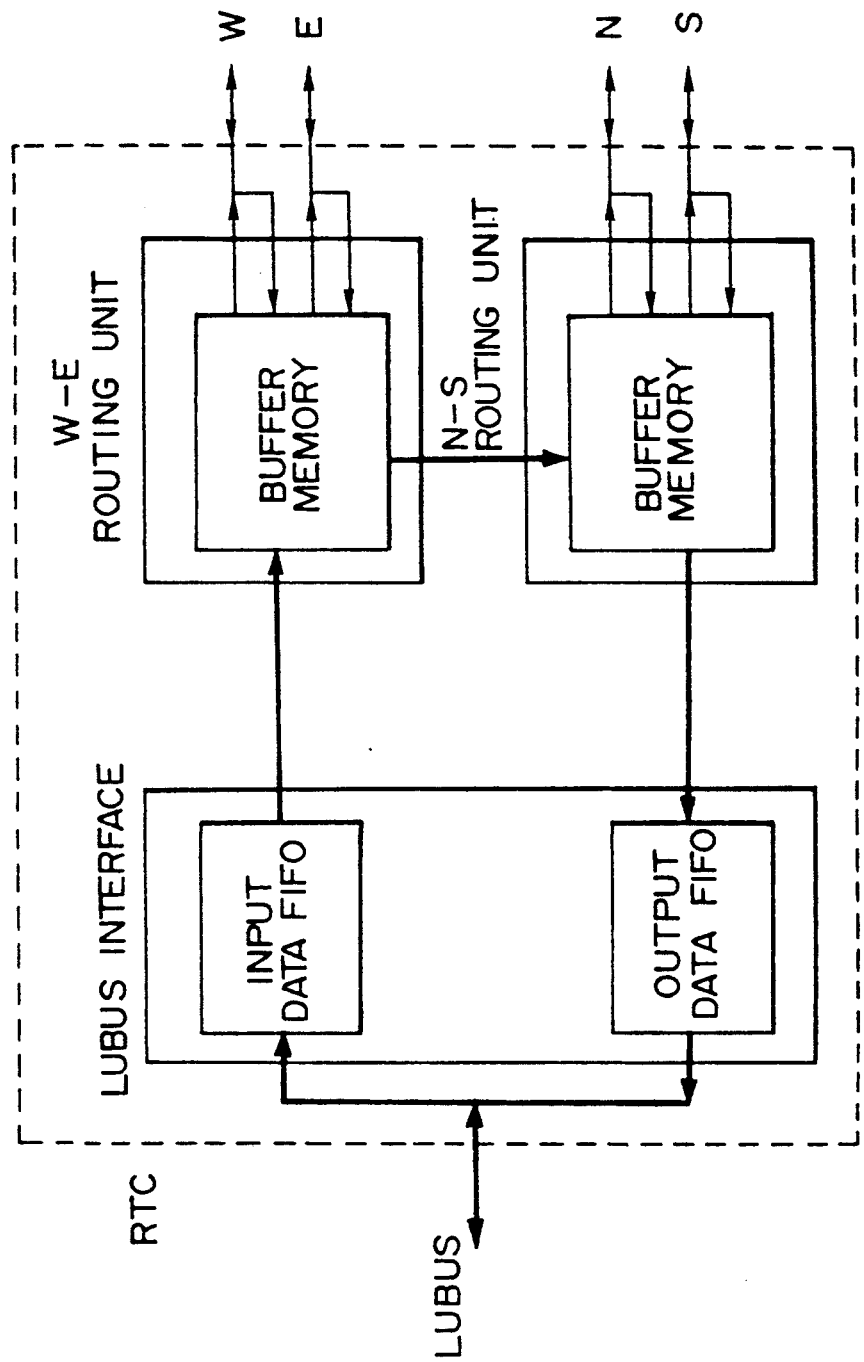
FIG. 9 shows a detailed block diagram of a routing controller provided in the PE shown in FIG. 5.

A routing unit RTC has a configuration as shown in FIG. 9. Routing is performed first in the x axis direction, and then in the y axis direction. When a sending cell and a receiving cell refer to an identical cell, sending and receiving are performed on the same route. Therefore, skipping a message can be avoided. In an RTC, a routing unit in the N-S direction and that in the W-E direction exist independently and connected in series.

Each routing unit determines the destination of data and executes buffering operation. To reduce the latency of data transmission, a worm hole routing method is adopted. Additionally, a buffer management algorithm called "structured buffer pool" is used to eliminate the deadlock or minimize the reduction of throughput even if a plurality of cells sending a sending request simultaneously.

A wormhole routing refers to a method of sending a message with a header forming a relay route directly from an input channel to an output channel. In each relay node, a part of a message is buffered.

In the normal store and forward routing method shown in FIG. 10B, a relay node buffers the whole message, while in the wormhole routing method shown in FIG. 10A, a few words of data called "flit" is buffered in a relay node. When a cell receives a head of a message, it selects a channel of a relay route and transmits a flit to the selected channel. Following flits are transmitted on the same route as that selected by the header flit.

Using a wormhole routing shortens the delay (latency) from sending to receiving a message. While the latency of the store and forward routing method varies in proportion to the product of distance between cells and a message size, the latency of the wormhole routing varies in proportion to the sum of distance between cells and a message size.

On the other hand, as a message in transmission blocks a channel it uses while it is transmitted, deadlock and throughput reduction may occur. An RTC realizes low latency, high throughput, and deadlock free operation by adopting the algorithm of structured buffer pool for the wormhole routing method featured by its small latency. This serves to avoid the reduction of the performance over the network due to the busy state in a part of the network when the transmission involves the whole network. As long as the sent data do not fail to be received by the destination cells, deadlock will not occur over the network.

Figure 11:
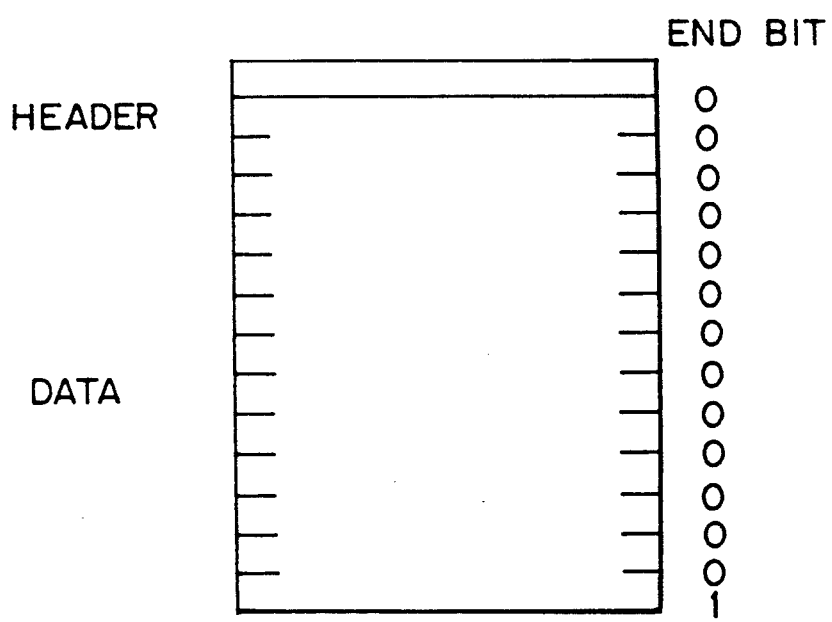
FIG. 11 designates a format of a message used in the routing controller shown in FIG. 7.

The data processed by an RTC contains a header indicating the beginning of a message, a main body of the message, and an end bit indicating the end of the message as shown in FIG. 11. A header may control various control information. An end bit is added automatically by a message controller.

The synchronization facilities associated with the present invention in such system described above are listed below:

In parallel processing, a means must be provided for ensuring that all cells must finish processing the present message before proceeding to the next step. The synchronization and status system is a hardware with necessary for efficiently performing a synchronization process.

Figure 12:
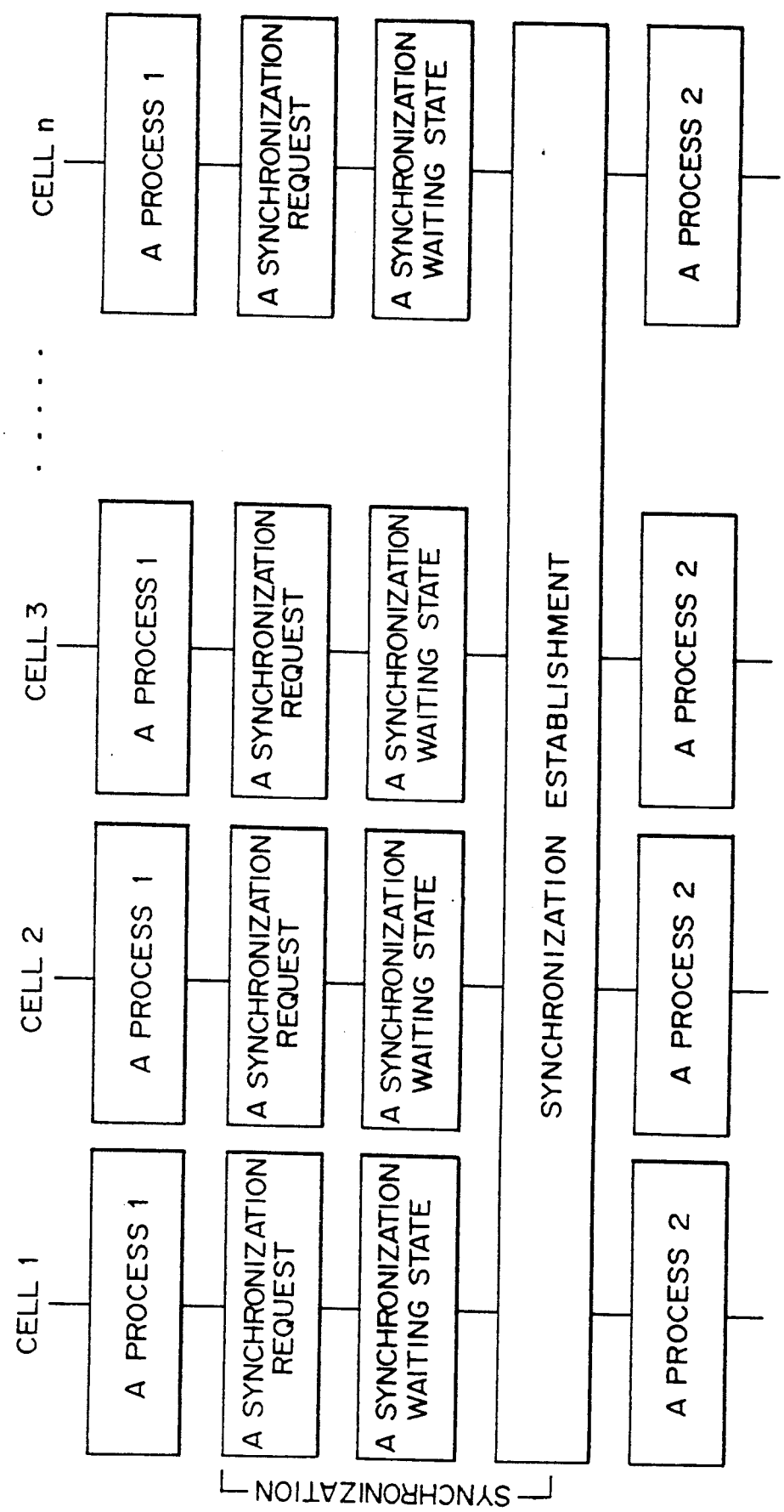
FIG. 12 explains a synchronization processing employed by the parallel computer system to which the present invention is applied.

As shown in FIG. 12, each cell issues a synchronization request after finishing the process 1. Each cell remains in the synchronization waiting state until confirming that all cells have issued a synchronization request. The establishment of the synchronization is notified by hardware, and then the process 2 is initiated.

Namely, a parallel computer such as the system implemented with the present invention, often involves a process where no processors proceed to the next step before they altogether get into an equal state. A synchronization and status system can efficiently realize such a type of synchronization.

The basic operation of the synchronization and status system is described as follows:

In the synchronization system, each cell has a synchronization request register. When the logical product (AND) of the outputs from all cells results in 1 is obtained from all cells, a synchronization detecting register is set. At this time, a synchronization request register should be cleared. When a synchronization detecting register is set, which means that all cells are issuing a synchronization request, it can be assumed that all cells are in the same state.

In the status system, each cell has a status request register. The logical product (AND) of the outputs from all the cells results in 1 obtained is set in the status detecting register. The status detecting register represents the the current value of the logical product of a status request register of all cells.

Figure 13:
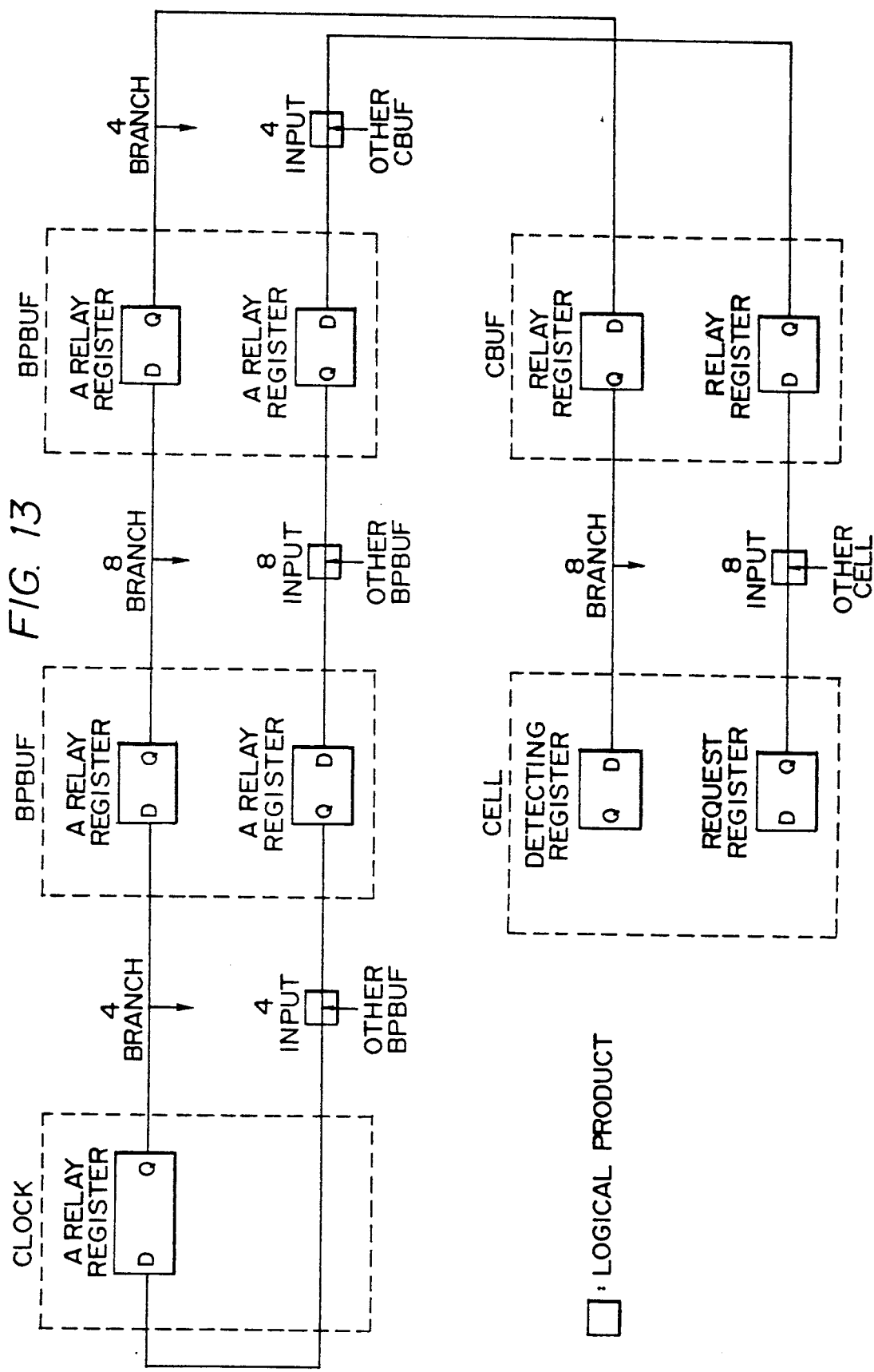
FIG. 13 shows a configuration of the synchronization and status system of the parallel computers to which the present invention is applied.

The synchronization and status system of the present invention has a hierarchical network configuration as shown in FIG. 13 to obtain AND of the output of registers from the maximum of 1024 cells. To make parallel operation active for a plurality of factors, a time divisional operation is performed for each factor. In the synchronization and status system network, the time divisional processing of a hierarchical network enables an 8-factor high speed synchronization, and 8-factor high speed status, a 32-factor low speed synchronization, and a 32-factor low speed status process to be operative. Registers of the synchronization and status system are implemented in a bus interface BIF chip.

Synchronization systems include such resources as a synchronization request register, a synchronization detecting register, a synchronization mask register, and a synchronization interrupt mask register. A high speed synchronization system has an 8-bit register, and a low speed synchronization system a 32-bit register.

A synchronization request can be by a CPU made by setting a synchronization request register. When synchronization is established, the corresponding bit of the synchronization detecting register is set, and the synchronization request register is reset. The CPU can be informed of the establishment of the synchronization by monitoring the synchronization detecting register. If the corresponding synchronization interrupt mask register is not set when a synchronization is established, the CPU is interrupted, thereby informing the CPU of the establishment of the synchronization. If a synchronization mask register is set, the cell does not take part in the synchronization. That is, it does not detect the synchronization and always keeps in the synchronization requesting state to other cells. Here, a mask function can be used to easily keep synchronized in the specific group of cells.

Status systems include a status register, a status detecting register, and a status mask register. A high speed status system has an 8-bit register, and a low speed status system a 32-bit register.

A status request can be made by a CPU by setting a status request register. A status detecting register is set to the "AND" value of status request registers of all cells. That is, the value of the status detecting register indicates the status of all the cells. If a status mask register is set, the cell does not participate in the status. It always keeps in the status requesting state to other cells. Here, a mask function can be used to easily keep in an equal state among a specific group of cells.

A synchronization and status function is intended to obtain the status of each cell at the point when synchronization is established. A synchronization and status operation can be performed by setting a synchronization and status mode register to combine a synchronization system and a status system. The synchronization and status mode can be set for each factor. In the synchronization and status mode, the operation of the synchronization system remains unchanged, but the operation of the status system is varied. In the normal mode, the "AND" of the status of all cells is set in the status detecting register. On the other hand, in the synchronization and status mode, the status of all cells is set only at the moment a synchronization is detected.

Figure 14:
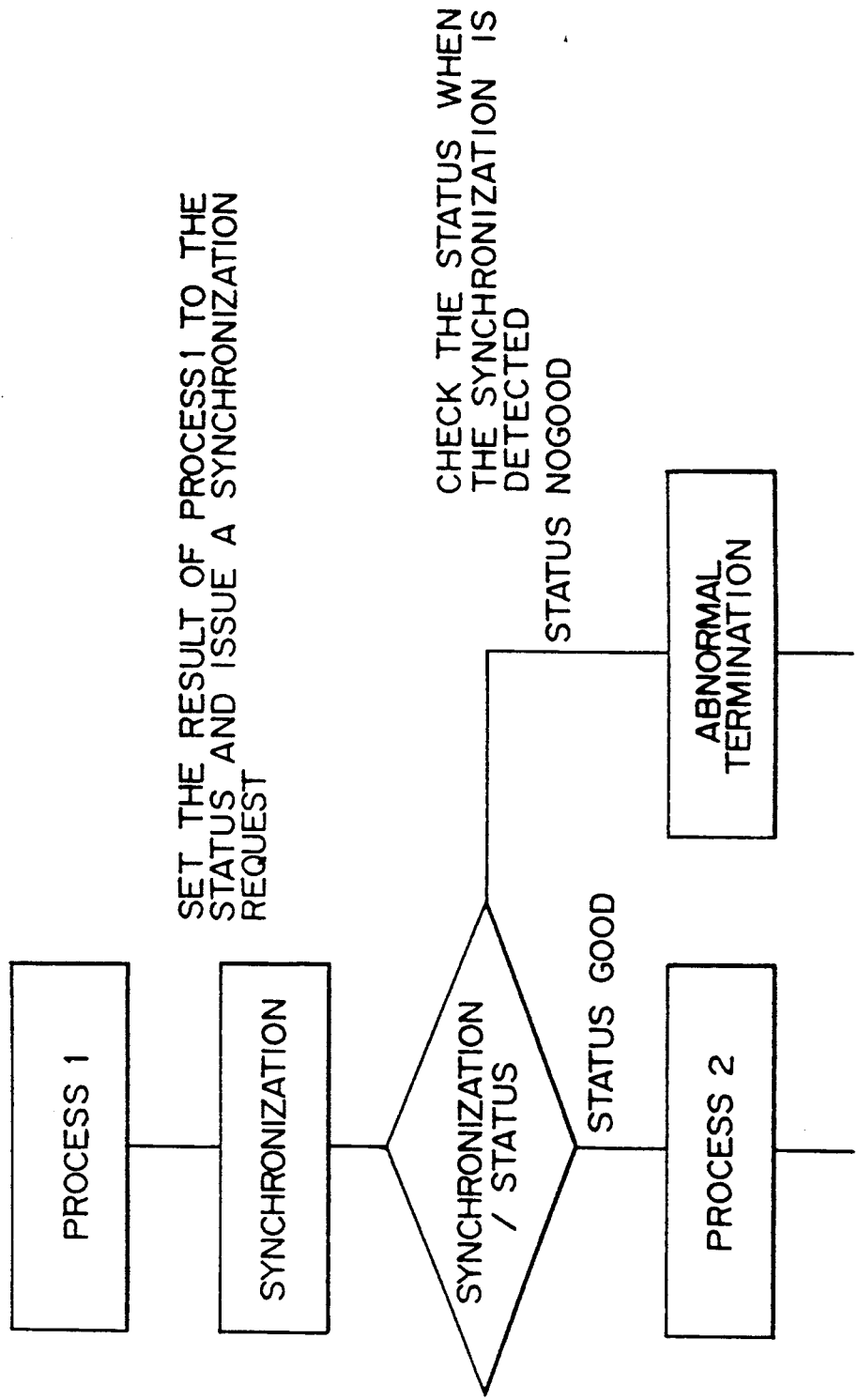
FIG. 14 shows a flowchart for performing a synchronization and status operation according to the present invention.

FIG. 14 shows how to use the synchronization and status function. A CPU of each cell sets a status request register at the synchronization request point if the preceding processes are performed normally. If there is any error, it clears the status request register. Then the CPU sets a synchronization request register, thereby getting into the synchronization request waiting state. The CPU in the waiting state for the completion of the synchronization starts reading the value of the status detecting register immediately after detecting the completion of synchronization, and then it proceeds to the next step after confirming that all cells have successfully completed the preceding processes without any error. If there is an error in more than one cell, The value of the status detecting register is set to zero (0), and all cells terminate their processes.

If any error occurs during a process, the synchronization and status function permits a cell to confirm the status of all processes when a synchronization is detected. Since an abnormal process in a cell can be detected and recognized by all the other cells which then take an appropriate action, the abnormally terminated cell will not keep waiting for synchronization.

Figure 15:
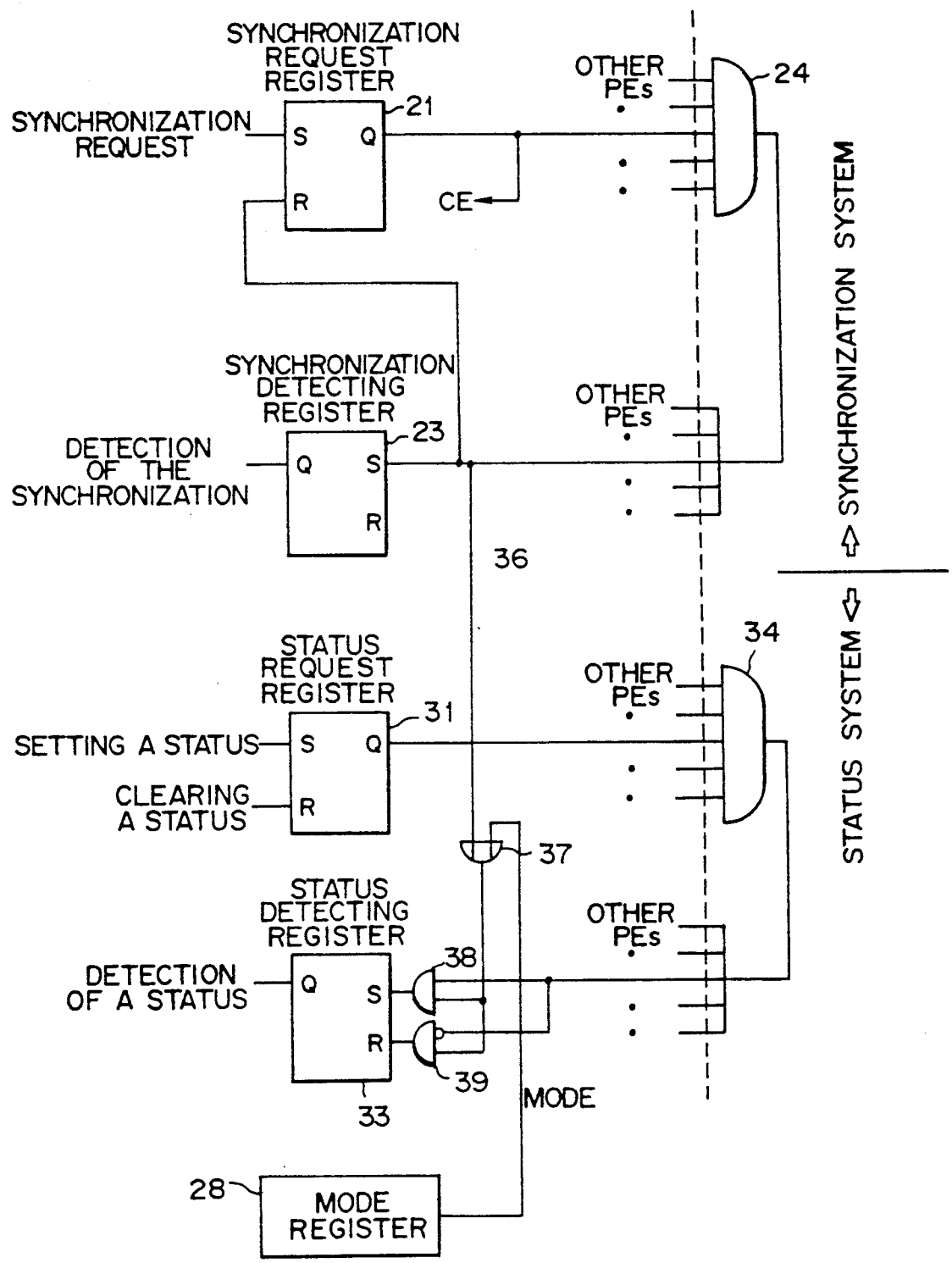
FIG. 15 designates a block diagram of an embodiment of a synchronization and status circuit according to the present invention.

FIG. 15 shows an embodiment of the present invention. First, the procedures for detecting synchronization are described as follows:

A CPU of each PE (refer to FIG. 14) gets into the synchronization detecting waiting state after setting a synchronization request register 21. The output of the synchronization request register 21 is returned to all PEs after the logical product is obtained by an AND circuit 24 at all PEs. When all PEs set the synchronization request register 21; the output of the logical product is 1, a synchronization detecting register 23 of all PEs is set, and simultaneously, the synchronization request register 21 is cleared.

A CPU of each PE can be informed that synchronization is established by monitoring the synchronization detecting register 23 through a dynamic loop and by an interrupt due to the synchronization detecting register 23 being set. The CPU which detects a synchronization proceeds to the next step.

In the present invention, a process can be performed in accordance with the following procedures to obtain status information as well as synchronization information. In FIG. 15, the output MODE of the mode register 28 is zero (0). If the preceding processes are performed normally, a CPU of each PE sets the status in the status request register 31 at the synchronization request point. If there is any error, it clears the status. Then the CPU sets a synchronization request register 21, thereby getting into the synchronization request waiting state. The outputs of the synchronization request register 21 and the status request register 31 are obtained as a logical product by the AND circuits 24 and 34 respectively in all PEs, and then returned to all PEs. When all PEs set the synchronization request register 21, the output of a logical product is one (1), thus setting the synchronization register 23 of all PEs. Simultaneously, the output of "1" from the AND circuit 24 which clears the synchronization request register 21 is sent to the status detecting register 33 through the OR circuit 37 and the AND circuit 38 on the status line 36. When the status of all PEs is normal and the output of the status request register 31 is a logic 1, the AND circuit 34 outputs a logic 1 and the output is distributed to all PEs again. Then, the status detecting register 33 is set after obtaining the logical product in the AND circuit 38 using the signal which is sent through the status line 36 and indicates the establishment of the synchronization of all PEs and the signal which is sent from the AND circuit 34 and indicates the establishment of the status request of all PEs.

The CPU in the waiting state upon the completion of the synchronization starts reading the value of the status detecting register 33, confirms that all PEs have completed their preceding processes without any error, and then proceeds to the next step. If there is an error in more than one PE, the output of the AND circuit 34 is a logic 0 and the value of the status detecting register 33 shows "0" through the AND circuit 39 even in the synchronous state in all PEs, thereby causing no PEs to proceed to the next step. As the data on the status line 36 is effective only when a synchronization is detected and is used to update the value of the status detecting register 33, this ensures that the status is detected at the point of establishment of the synchronization of all PEs.

The synchronization system and the status system can be operated concurrently or independently by controlling them with a mode register 28 capable of reading/writing a mode from a CPU. That is, when the output mode of the mode register 28 is "1", the status detecting register 33 can be set to "1" if the status of all PEs is normal even though the signal on the status line 36 is zero (0) and the synchronization of all PEs is not yet established. Therefore, the status system can be operated independently regardless of operating state of the synchronization system.

Figure 16:
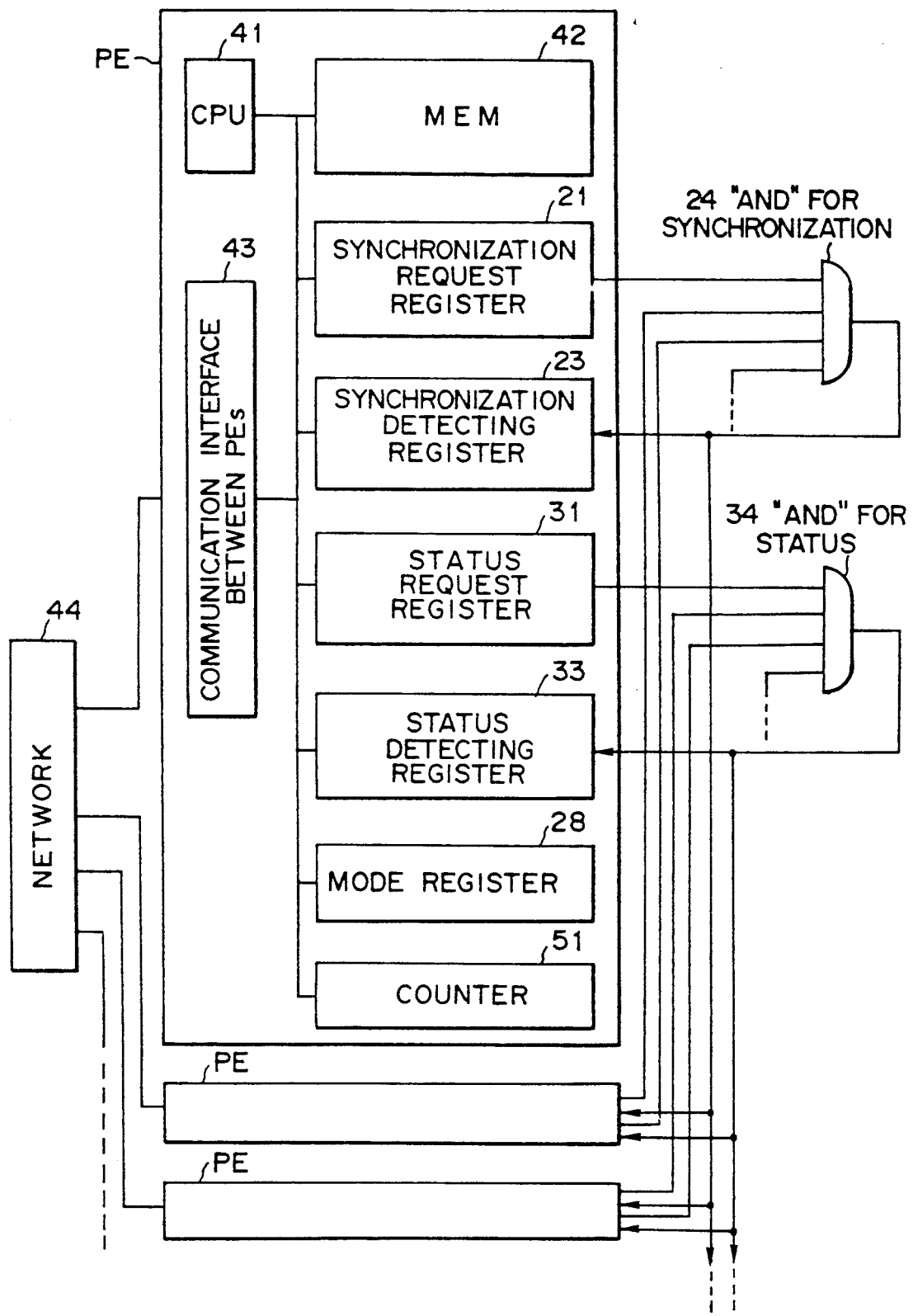
FIG. 16 designates a configuration of PE and a whole system of the parallel computers according to the embodiment shown in FIG. 15.

FIG. 16 shows a configuration of PEs comprising the embodiment of the present invention as shown in FIG. 15, and a general configuration of a parallel computer system. The identical items to those shown in FIG. 15 are assigned the same reference numbers and the explanation thereof is skipped.

A PE has a synchronization request register 21, a synchronization detecting register 23, a status request register 31, a status detecting register 33, a mode register 28, and a counter 51, each connected to a CPU 41 and a memory MEM 42 through a data bus line. The data bus is connected to a network 44 through an inter-PE communication interface 43, thus permitting communication to another PE. The synchronous request register 21 and the status request register 31 of each PE are connected to the AND circuits 24 and 34, whose outputs are distributed to the synchronous detecting register 23 and the status detecting register 33, respectively.

Figure 17:
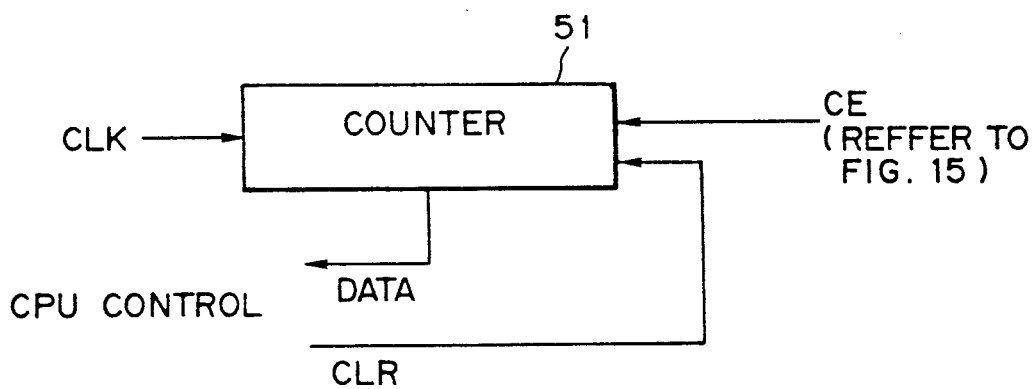
FIG. 17 shows a circuit diagram of a counter for counting a time required for awaiting establishment of the synchronization in the embodiment shown in FIG. 15.

In a parallel computer, synchronization waiting time should be shortened because it is a waste of time. It is important to know which PE needs longer time in executing a program. In the embodiment shown in FIG. 17, a counter 51 is provided for counting a clock for each PE. When the output of the synchronization request register 21 (before a logical product of all PEs is obtained) is one (1), the counter starts counting up, and stops counting when a synchronization is detected. When a synchronization request and synchronization detection are repeatedly performed, the time for requesting a synchronization is accumulated.

A user executes a program after clearing the counter 51, and then reads the value of the counter, thereby finding the synchronization overhead of the program. Such capabilities are available with software, but the required time cannot be measured exactly or unexpected bugs may possibly occur because the program executing time varies depending on whether or not the measuring operation is performed.

If an error occurs during the process, synchronization can be detected, and simultaneously all PEs can confirm the state of the process.

Figure 18:
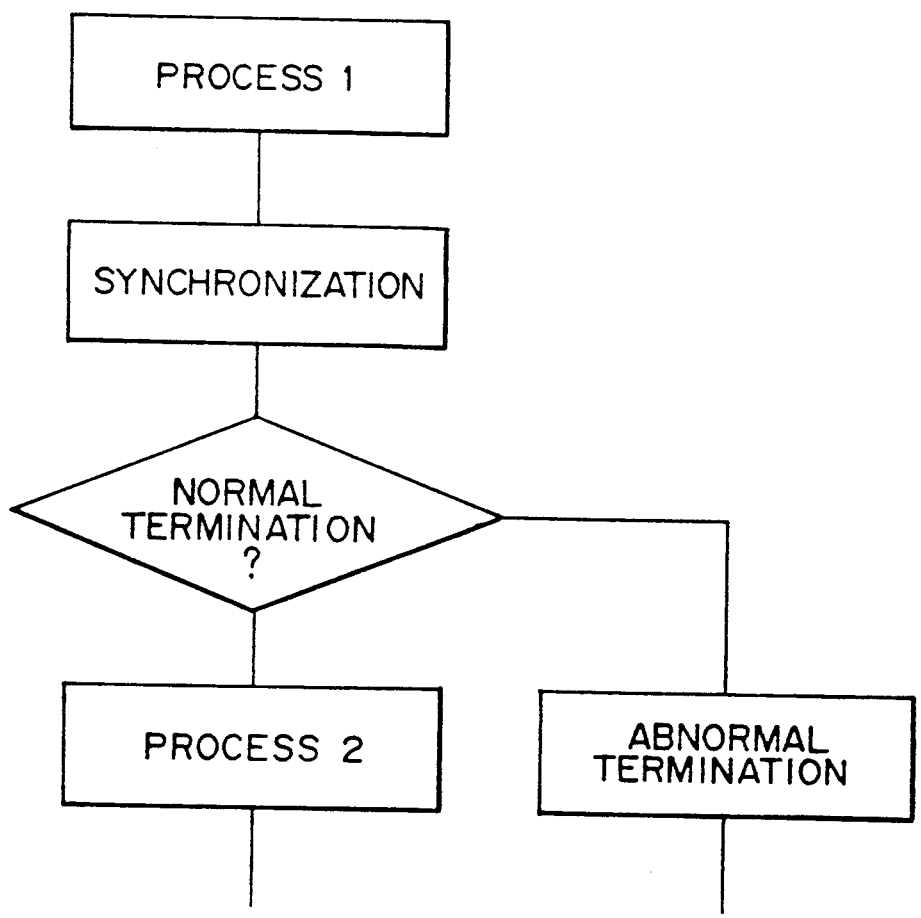
FIG. 18 shows a flowchart for performing the synchronization and status process in the embodiment shown in FIG. 15.

According to the embodiment of the present invention as shown in FIG. 18, when the process 1 terminates in a certain PE, a normal termination of all PEs can be detected and determined after the establishment of synchronization, and an appropriate action can be taken when an abnormal process is detected. Accordingly, a normally terminated PE will not be kept waiting for synchronization. A normal termination permits proceeding to the process 2.

As shown in FIG. 18, the determination of a normal termination described above can be replaced with the determination of whether or not an operation error in each PE is within the predetermined allowable range. If an error is within that range, the next process 2 can be performed. In this case, the status of the status request register 31 can be set when a process is converged in FIG. 13.

Figure 19:
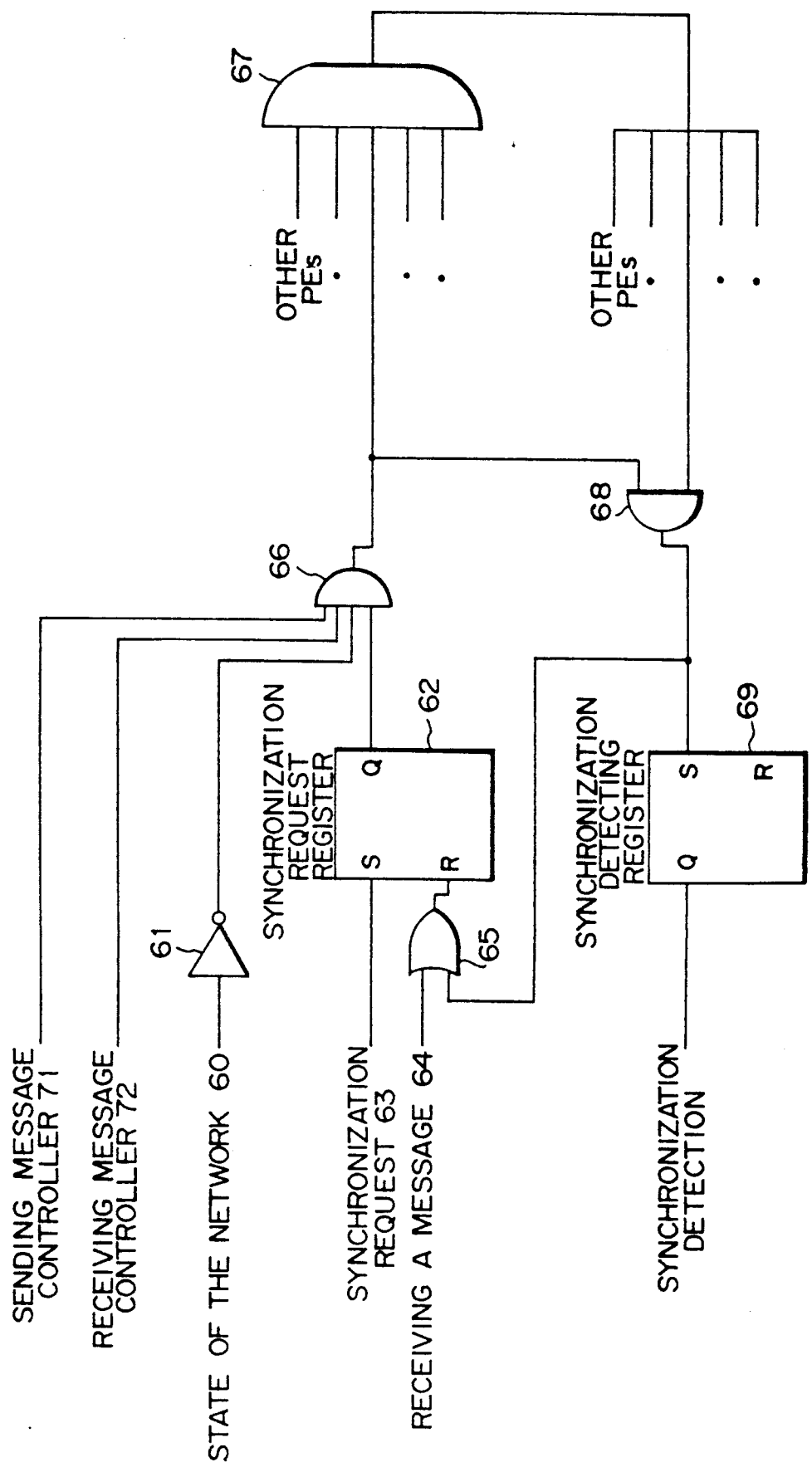
FIG. 19 designates a block diagram of the second embodiment of the present invention.

FIG. 19 shows another embodiment of the present invention. The following procedures are used to detect the stable state of all PEs.

The network state signal 60 is a signal for indicating that a message exists in a network when it is set to "1", while the output of the reverse circuit 61 is "1" where are no messages in the network. That is, the network status signal 60 is set to "1" when there is a message in the network through the signal line of the network. Therefore, when at least one network status signal line of all PEs shows 1, it indicates there is a message in the network.

FIG. 20 is a flowchart for detecting the network status.

First, a PE determines whether or not a message exists in its PE. If there is a message, it keeps showing an existence-of-message status. The determination can be made by detecting the existence of data in the specific register of its own PE. If there are no messages in its own PE, the PE determines whether or not a specific time has passed. The specific time corresponds to the traveling time of data to the destination PE. The lapse of the specific time means that there are no messages in the network. That is, if a PE has no messages in its own PE and the specific time has passed, the PE has no messages either in its own PE or in the communication route between it and the correspondent PE, which means there are no messages in the network.

In FIG. 19, the synchronization request register 62 is set when the synchronization request signal 63 is "1". Setting the synchronous request register 62 means the termination of the the current processing step of the current PE, issuing a synchronization request to another PE. A message receipt signal 64 is a signal line for indicating that a PE has received a message from any other PE in the network. If the signal shows "1", the output of the OR circuit 65 is also "1", clearing the synchronization request register 62 is cleared. For example, if a PE issues a synchronization request signal assuming that it has finished a process, and if a message arrives a little later, the receipt of this last message clears the synchronization request register 62, and corrects the synchronization request signal 63 from the PE. The synchronization request register 62 is also cleared by the AND circuit 68. To accomplish this, the AND circuit 68 sets the synchronization detecting register 69, the synchronization request register 62 in that process step is reset to be ready for receiving the synchronization request signal 63 from the current PE in the next step.

A CPU sets the synchronization request register 62 when there are no messages for a PE, and then keeps waiting for the stable status after issuing a synchronization request. When a message arrives from the PE, the signal line of the message receipt signal 64 turns "1", clearing the synchronization request register 62. If a CPU clears the synchronization request register 62, the synchronization request register 62 must be cleared before receiving one whole message from the network. The CPU after completing processing the message resets the synchronization request register 62 again.

The logical product of the output of the synchronization request register 62, the reverse of the network status signal 60 and outputs from the sending and receiving message controllers 71 and 72 (which will be explained by referring to FIG. 21.) is obtained in the AND circuit 66. The synchronization stable request signal is output from the AND circuit 66, and the logical product for all PEs is obtained in the AND circuit 67 and returned to all PEs. When there is a message in the network, the output of the AND circuit 66 is "0" because the reverse circuit 61 is "0" even if a synchronization request from each PE is output from the synchronization request register 62, thus preventing the synchronization stable request signal from being output. Accordingly, the output of the logical product of all PEs (the output of the AND circuit 67) does not show "1" when the network status of at least one PE shows "0".

When the synchronization request register 62 of all PEs is set and there are no messages in the network; a synchronization stable request signal is output by the AND circuit 66, the output of the logical product of all PEs is "1", the synchronization detecting register 69 of all PEs is set through the AND circuit 68, and simultaneously the synchronization request register 62 is cleared. In the AND circuit 62, a synchronization stable request signal, an output of the AND circuit 66, indicating that there are no messages in the network and the PE is issuing a synchronization request, are input, and a signal, an output of the AND circuit 67, indicating that all PEs are issuing a synchronization stable signal is also input. According to the AND circuit 68, the output of the synchronization stable request signal can be confirmed.

The synchronization detecting register 69 provides an output on condition that there are no messages in the network. Accordingly, the stable state of all PEs can be detected by monitoring the output of the synchronization detecting register 69. In the present invention, a PE is prevented from recognizing the stable state earlier than other PEs and proceeding to the next step to send a message, but every PE is permitted to proceed to the next step after detecting that the stable state is established through the synchronization detecting register 69.

FIG. 21 shows a configuration of the circuit of third embodiment of the present invention, the embodiment indicating the state of the network when the status of each PE is detected. The stable state of all PEs can be detected with the following means.

The network state 70 is provided by a signal line from the network, when there is a message in the network through the signal line of the network, at least one signal line of each PE indicates that there is a message in the network. The signal shows "1" when there are no messages in the network.

The sending message controller 71 (provided for each PE) indicates there are no messages to send.

The receiving message controller 72 (provided for each PE) indicates there are no messages to receive. A CPU of each PE receives a message from this receiving message controller when it receives a message. A signal designating network state 70 shows whether or not the message exists in the other part than message transmitting controller and message receiving controller 72 in respective PEs.

A message receiving signal 73 is a signal line to indicate the arrival of a message from the network. The signal clears the status request register 75 which was set by the status request 74.

When there are no messages in a PE, a CPU sets the status request register 75 and waits for the stable state. When a message reaches the PE, the signal line indicating a receipt of a message turns "1", and the status request register is cleared. If the PE finishes processing the message, the CPU sets the status request register 75 again.

The logical product of the output of the status request register 75, the output of the network state 70 and the output from message transmitting controller 71 and message receiving controller 72 is obtained for all PEs by AND circuit 76, and logical product of the outputs of all PEs obtains by AND circuit 77 is returned to every PE. When a message exists in the network, the network state of at least one PE shows "0", giving the result that the overall output of logical product is not "1".

When the status request register 75 of all PEs is set and no messages exist in the network, the overall output of logical product is "1", setting the status detecting register 78 of all PEs is set through AND circuit 79. When each PE changes status from the message waiting status to the message processing status (each PE is not in the stable state) as each PE receives a message from the network, the status request register 75 must be cleared before receiving the whole message from the network. If a CPU does not clear the status request register 75, then the status request register 75 is cleared according to a signal on a message receipt signal line.

Every PE can detect the stable state by monitoring the status detecting register 78. Even if one PE detects the stable state earlier than other PEs and proceeds to the next step to send a message, other PEs can detect the establishment of the stable state through the status detecting register, thus proceeding to the next step.

FIG. 22 shows a circuit diagram of a further embodiment of the present invention. Like parts are designated by the same reference numbers between FIG. 22 and FIGS. 19 and 21 and there explanations are omitted.

This embodiment shows that the network state is detected when the requests for the synchronization and the request for the status are determined to issue in the synchronization and status system for detecting the status of the PE after detecting that the synchronization of all PEs is established.

The present invention ensures performing an arithmetic and logical operation in a parallel computer system at a higher speed than the prior art technology. This is accomplished by every PE's detecting the status of an abnormal process in one PE and taking an appropriate action even if the synchronization of all PEs is established.

The present invention also promises a wider scope of application of synchronous and status system hardware by enabling processing in the synchronization and status mode concurrently or independently. This is ensured by a mode register used as a synchronization and status mode control register.

Additionally, an synchronization waiting time accumulation counter applied with the present invention notifies the distribution of loads of a plurality of PEs without modifying the operation of each PE.

In the present invention, the stable state of all PEs including the network state can be detected by the synchronization detecting circuit.

When each PE turns from the message waiting status to the message processing status (each PE is not in the stable state) as each PE receives a message from the network, a CPU does not clear the synchronization request register, but the synchronization request register is cleared according to a signal on a message receipt signal line, thus detecting the stable state safely at a high speed.

In the present invention, the stable state of all PEs including the network state can be detected by the status detecting circuit.

In the present invention, as the status request register is reset directly by receiving a message, a status request can be output at a higher speed from the status request register than in the case where the status request register is set by the status request from a CPU when a message is received.

What is claimed is:

1. An inter-processor synchronization control system in a distributed memory type parallel computer provided with a plurality of independently operated processor elements, said system comprising:
   synchronization request register means for permitting each processor element to independently issue a synchronization request through a synchronization request signal;
   determining means for determining the issuance of requests from synchronization request registers of all of said processor elements;
   distributing means for distributing said determination to all of said processor elements;
   synchronization detecting register means for detecting synchronization according to said distributed determination;
   status request register means provided for each processor element for independently issuing a status request through a status request signal,
   means for determining the issues of requests from status request registers of all of said processor elements,
   distributing means for distributing said determination to all of said processor elements; and
   status detecting register means for detecting the status according to said distributed determination and the output of said synchronization detecting means,
   said inter-processor synchronous control system detecting the status of all of said processor elements when the synchronization is established in all of said processor elements.

2. An inter-processor synchronization control system according to claim 1, wherein said system performs its synchronization and status operation either concurrently or interchangeably through a mode register for controlling the connection/disconnection of the synchronization and status systems.

3. An inter-processor synchronization control system in a parallel computer system according to claim 1, wherein each processor element has a counter for counting a clock, accumulates the time period per processor element from the issuance of a synchronization request to the detection of the synchronization, and measures the synchronization overhead time pe processor element with little affection on the program processing time.

4. An inter-processor synchronous control system according to claim 1, wherein said status detecting register detects errors if any in each processor element.

5. An inter-processor synchronization control system according to claim 1, wherein said status detecting register detects that an operation result of each processor element converges.

6. An inter-processor synchronization control system in a distributed memory type parallel computer for operating a plurality of independently operated processor elements
   means for detecting the establishment of the synchronization of all of said processor elements,
   status request distributing means for distributing the status of each processor element to all the other of said processor elements, and
   status detecting means for detecting that the status of all of said processor elements has reached the specified status and the synchronization of all of said processor elements has been established.

7. A stable state detecting system in a distributed memory type parallel computer connected with a number of independently operated processor elements through the communication network comprising:
   synchronization request register means for permitting each processor element to independently issue a synchronization request through a synchronization request signal,
   means for obtaining a logical product of the output from synchronization request registers of all of said processor elements,
   means for distributing said result to all of said processor elements,
   synchronization detecting register means for detecting the synchronization according to said distributed result;
   means for receiving a signal indicating the communication network status,
   synchronization stability request detecting means for detecting a synchronization request in each processor element and no messages in the network through the output of said synchronous request register and a signal line for receiving said status signal, wherein said stable state detecting system detects that no messages exist in the network and that all of said processor elements are in the message waiting state.

8. A stable state detecting system in a parallel computer according to claim 7 comprising:
   means for notifying the arrival of a message from the communication network to of said processor elements; and
   a circuit for clearing a synchronous request register according to the signal notifying the arrival of a message.

9. A stable state request detecting means in a parallel computer according to claim 7 capable of obtaining a logical product of a signal on a signal line indicating the network status and the output of a synchronization request register.

10. A stable state detecting system in a parallel computer according to claim 7, wherein a synchronous detecting register is according to a logical product of said synchronization stable request detecting means and synchronization stable requests of all of said processor elements.

11. A stable state detecting system in a distributed memory type parallel computer connected with a number of independently operated processor elements through a communication network comprising:
   a status request register indicating the status of each processor element,
   means for obtaining a logical product of a status request register for all of said processor elements,
   means for distributing the result to all of said processor elements
   status detecting register means for detecting a status according to the distributed result, and
   means for indicating the communication network state, wherein
   said stable state detecting system detects that no messages exist in the network and that all of said processor elements are in the message waiting state by obtaining the logical product of the signal line notifying the state of the communication network and the output of the status request register.

12. A stable state detecting system according to claim 11 further comprising means for notifying the arrival of a message from the communication network to said processor elements, wherein
   said stable state detecting system detects the stable state of all of said processor elements by adding a circuit for clearing the status request register according the signal notifying the arrival of a message.

13. A stable state detecting system according to claim 11 further comprising means for notifying the existence of a message from a sending message controller and a receiving message controller wherein:
   said stable state detecting system obtains a logical product of the signal on the line indicating the state and the output of the status request register.

14. A Stable state detecting system according to claim 7 further comprising sending message controller means for representing that the message from a sending message controller does not exist, and receiving message controller means for representing that the message from a receiving message controller does not exist, wherein a logical product of an output of the synchronization request register and the outputs from said sending and receiving message controllers is established.

* * * * *